No. 816,636. PATENTED APR. 3, 1906.
O. T. BANKS.
ADJUSTABLE SUPPORT FOR INCANDESCENT ELECTRIC LAMPS.
APPLICATION FILED OCT. 6, 1904.
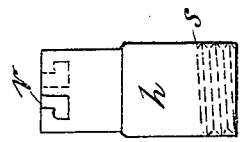
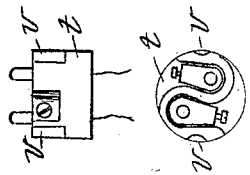
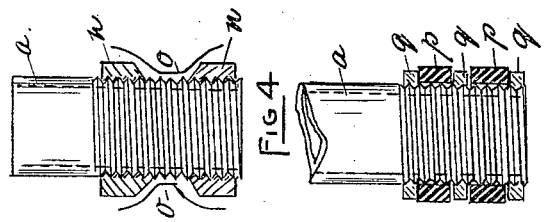
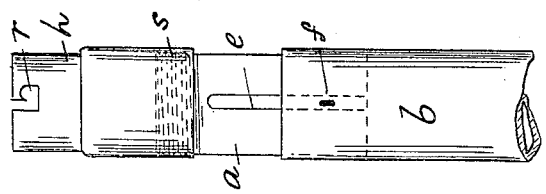
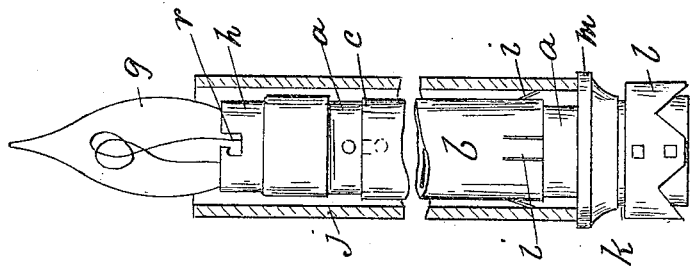
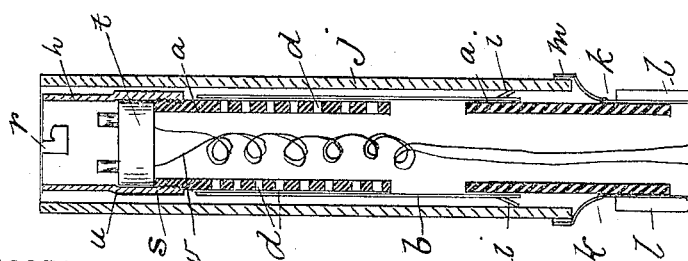
WITNESSES.
Samuel Percival
Albert Jones
INVENTOR
Oscar Thomas Banks
By his Attorneys
Wheatley & Mackenzie

UNITED STATES PATENT OFFICE.

OSCAR THOMAS BANKS, OF LONDON, ENGLAND.

ADJUSTABLE SUPPORT FOR INCANDESCENT ELECTRIC LAMPS.

No. 816,636.　　　　　Specification of Letters Patent.　　　Patented April 3, 1906.

Application filed October 6, 1904. Serial No. 227,497.

*To all whom it may concern:*

Be it known that I, OSCAR THOMAS BANKS, a subject of the King of Great Britain, residing at 49 Mortimer street, Cavendish Square, London, England, have invented certain new and useful Improvements in Adjustable Supports for Incandescent Electric Lamps; and I do hereby declare the following to be a full, clear, and exact description of the invention, such as will enable others skilled in the art to which it appertains to make and use the same.

This invention for improvements in adjustable supports for incandescent electric lamps relates to imitation candle-supports of the kind wherein the lamp-socket is fixed on an inner tubular stem or support inclosed in an outer tube of porcelain or similar material, and has for its object to provide an insulating-support and lamp holder or stem that shall be simple in construction, readily adjustable to porcelain or similar inclosing tubes of different lengths, and that shall have ample space within itself for receiving the electric cords or connections, enabling them to be coiled or otherwise arranged so as to leave plenty of spare or slack cord to allow for the lengthening of the stem; and it consists of a telescopic tubular stem formed of or lined with insulating material—such as fiber, woodite, or the like—adapted to fit at one end into an extension of the lamp-socket, wherein it forms a sholder or stop for a removable porcelain base in the lamp-socket, and having at the other end a collar or support for the porcelain or similar inclosing tube, below which is fixed a suitable spring or other resilient attachment for fitting into the candle-socket.

In one way of carrying out this invention the hollow stem or support is made of two tubes of fiber composition joined together by a thin metal sleeve of sufficient length to allow of the necessary lengthening or shortening of the stem by pushing one of the fiber tubes more or less into the sleeve or pulling it out therefrom. When adjusted, the tube is fixed to the sleeve in any suitable manner. A sleeve is fixed to the fiber tube forming the lower portion of the stem and carries a conical support for the porcelain tube and spring-strips for securing the stem in the candle-socket. On the upper end of the stem is screwed a ferrule or extension of the lamp-socket, in which is contained the porcelain insulator carrying the usual contact-plungers and resting on the end of the fiber tube, which forms a stop therefor. The stem is of such a diameter that it nearly fills the porcelain or similar inclosing tube, which is kept steady by spring-tongues bent out from the metal sleeve or by other suitable means.

It will be seen that by forming the stem with a large and substantially uniform diameter throughout its whole length plenty of space is left inside for the passage of the electrical cords or connections, which should be left sufficiently slack to allow for all possible extensions of the stem, and, further, the annular space between the stem and inclosing tube being small and free for practically the whole height of the tube the appearance of shadows or dark and light portions in the tube is avoided.

In the accompanying drawings, Figure 1 is a vertical section of a lamp-support constructed according to this invention. Fig. 2 is a vertical section through the inclosing tube, showing the stem or support in elevation with the lamp inserted. Fig. 3 is an elevation of a stem, showing a slight modification. Figs. 4 to 7 are detail views.

As shown, the hollow stem or support comprises the two tubes $a$ $a$, of fiber composition or other insulating material, connected by a metal sleeve $b$, which is preferably fixed on the lower tube $a$, the upper tube $a$ being slid up or down to effect the adjustment and then fixed or prevented from turning. In the form of stem illustrated in Figs. 1 and 2 the fixing of the upper tube $a$ to the sleeve $b$ is effected by cutting the sleeve $b$ at the top, so that portions $c$ can be easily bent inward, with a suitable tool to engage in one of the series of rows of holes $d$ in the upper tube $a$.

Instead of being provided with holes $d$ (shown in Fig. 1) the tube $a$ may have a slot or groove $e$, as shown in Fig. 3, in which a projection formed at $f$ on the sleeve $b$ engages and prevents the upper tube $a$ from turning in the sleeve when the lamp $g$ is inserted in the holder $h$.

The lower end of the sleeve $b$ is fixed on the lower tube $a$ by indenting portions of the sleeve $b$ with a punch in the well-known manner. A series of spring-tongues $i$ are formed at the bottom of the sleeve $b$ by cutting and bending portions of the sleeve outward. These tongues bear against the inclosing tube $j$ and keep it steady.

A sleeve $k$, with spring-strips $l$, is fixed on the bottom of the stem to hold the candle in its socket, the sleeve $k$ also carrying a suitable gallery or support $m$ for the tube $j$. Other devices for securing the candle in its socket are shown in Figs. 4 and 5. In Fig. 4 the lower end of the stem is screw-threaded to receive screw-collars $n$ $n$, between which a ring $o$, with spring-arms, is secured. In Fig. 5 the screw-threaded lower end of the stem is provided with rings of india-rubber $p$, held in position by collars $q$. Any other suitable arrangement may be employed for fixing the candle in its socket.

The lamp-holder $h$ consists of a tube with bayonet-slots $r$ and with a downward tubular extension $s$, screw-threaded internally and arranged to screw onto the top of the upper tube $a$, the porcelain base $t$ being held between a shoulder $u$ and the top of the tube $a$ and readily removable. As shown in Fig. 7, the porcelain base $t$ has grooves $v$ formed therein. These grooves extend to about half the depth of the base $t$ and receive projections formed by a punch in the extension $s$, which serve to guide and determine the position of the base when it is inserted in the holder.

As clearly seen in Fig. 1, the usual electrical cords or connections $w$ may be coiled or otherwise arranged in the hollow stem so as to leave plenty of slack cord.

In assembling the parts the connections $w$ are passed through the stem $a$ $a$ $b$ and secured by binding-screws in the usual manner to the insulator $t$, which is then inserted in the lamp-holder $h$ and fixed by screwing in the stem. The inclosing tube is then placed over the stem $a$ $a$ $b$ and lamp-holder, the lamp being afterward inserted.

What I claim, and desire to secure by Letters Patent, is—

1. An adjustable imitation candle-support for incandescent electric lamps, comprising a telescopic insulating hollow stem or support having sufficient free space within it to contain slack electrical cords or connections, a lamp-socket mounted on the stem, means for fixing the stem in the candle-socket and means for supporting an inclosing tube on the stem.

2. An adjustable imitation candle-support for incandescent electric lamps, comprising a telescopic insulating hollow stem or support having sufficient free space within it to contain slack electrical cords or connections, a cylindrical lamp-socket provided with bayonet-slots adapted to be screwed onto the stem, a removable porcelain insulator for the usual contact-plungers, adapted to be inserted in the holder and secured by screwing in the insulating-stem, means for fixing the stem in the candle-socket and means for supporting an inclosing tube on the stem.

3. In an adjustable imitation candle-support for incandescent electric lamps, a hollow telescopic stem or support consisting of two tubes of fiber composition or other insulating material, and a metal sleeve joining the two tubes and fixed to one tube but free to slide on the other tube, and means for fixing the sliding parts after adjustment substantially as described.

4. In an adjustable imitation candle-support for incandescent electric lamps, a hollow telescopic stem or support consisting of upper and lower telescopically-connected tubes of fiber composition or other insulating matrial, a cylindrical lamp-socket fitting on the upper tube, and a removable porcelain base secured in the socket by the insertion of the said tube substantially as described.

5. In an adjustable imitation candle-support for incandescent electric lamps, a lamp-socket provided with bayonet-slots, a removable insulating-base inserted in the socket, and a telescopic insulating hollow stem or support adapted to fit into the lower part of the lamp-socket and form a stop for the insulating-base substantially as described.

In testimony whereof I have affixed my signature in presence of two witnesses.

OSCAR THOMAS BANKS.

Witnesses:
 HERBERT D. JAMESON,
 FREDK. L. RAND.